W. V. PERRY.
Stovepipe Damper.
No. 62,559.
Patented March 5, 1867.
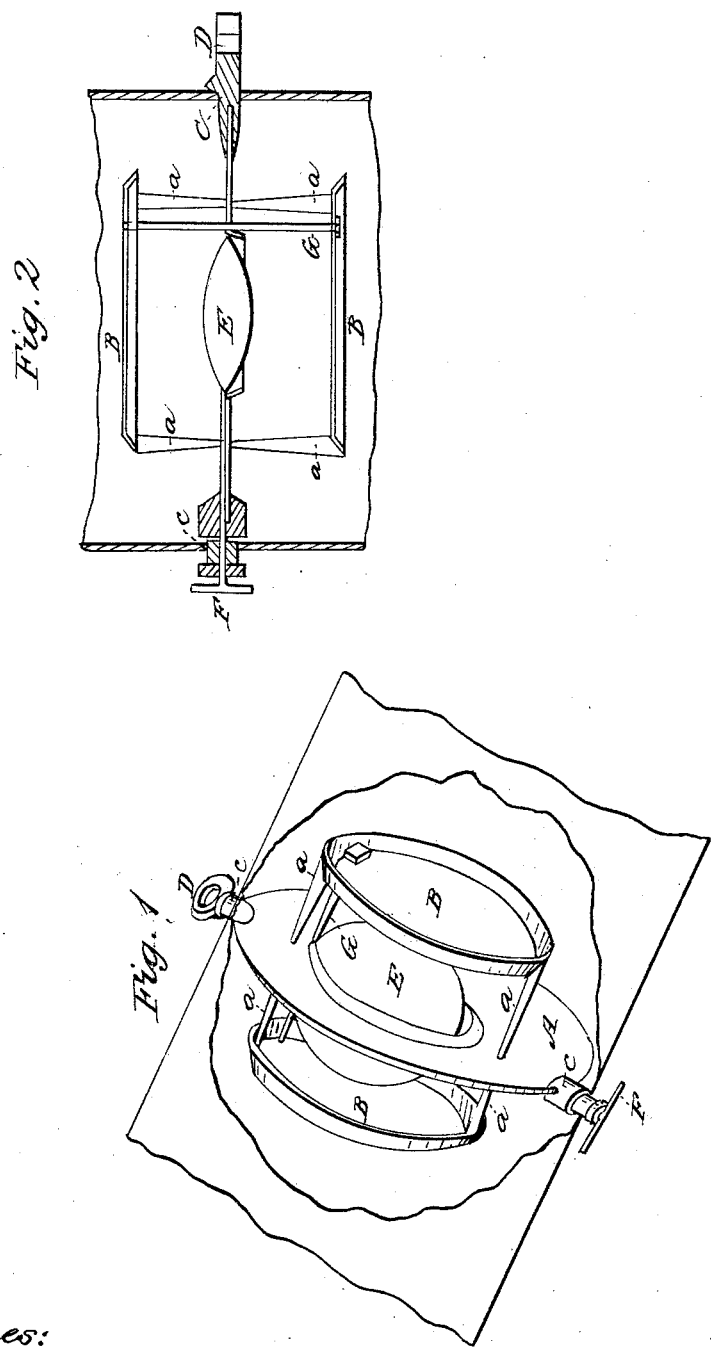
Witnesses:
Inventor:
William V. Perry

United States Patent Office.

WILLIAM V. PERRY, OF BURNETT, WISCONSIN.

Letters Patent No. 62,559, dated March 5, 1867.

---

STOVE-PIPE DAMPER.

---

The Schedule referred to in these Letters Patent and making part of the same.

---

TO ALL WHOM IT MAY CONCERN:

Be it known that I, W. V. PERRY, of the town of Burnett, in the county of Dodge, and State of Wisconsin, have invented new and useful improvements in Stove-Pipe Dampers; and I hereby declare that the following is a full and exact description thereof, reference being had to the accompanying drawing, and to the letters of reference marked thereon.

Figure 1 is a perspective view of the damper; and

Figure 2 is a sectional view taken through the centre of the damper.

Letter A represents the central plate in centre of which is an aperture of about one-half of the diameter of the plate. B B represent the outer flange plates; C C the pivots or bearings attached to central plate A, on which the damper is supported in stove pipe H. D represents the handle, through which passes an elliptical hole. E represents the revolving valve, F the T-shaped handle of the revolving valve. G G represents the bolt passing through the plates A and B B at one side of opening in plate A, by which the damper is held firmly together, and also supports the inner bearing of revolving valve E.

To enable others skilled in the art to which my invention appertains to make and use the same, I will proceed to describe its construction and operation.

In the construction of this damper the outer plates B B are supplied with legs $a\ a\ a$ at right angles with the plates, and so arranged that when in combination with the central plate A all are held firmly together by the bolt G. To the centre plate A are attached the pivots C C on which the damper is revolved. To one of the pivots is attached a handle in which is an elliptical opening, through which aperture may be inserted the stove handle or other instrument for the purpose of turning the damper. The valve E is operated within the opening in the central plate A, by means of the T-shaped handle F, extending through the pivot C opposite the handle D. In constructing this damper, the flanges or mouths of the saucer-shaped plates B B, together with the flange on centre plate A, are so arranged as to point all in the same direction, and yet allow the free passage of the smoke. The use of the valve E is the more effectually to stop the draught when required, and for the better keeping of the fire through the night.

The operation of this damper is the same as that of four positive, distinct, different dampers, to wit: first, with the plates in a vertical position, and valve open, it causes a slight resistance to the passage of the heat and smoke; second, with the plates in a horizontal position, and valve open and flanges pointing upward, there is still a greater resistance to the passage of the heat and smoke; third, with the plates in a horizontal position, with valve open and flanges pointing downward, there is yet a greater obstruction to the draught; fourth, with the plates in the same position as last mentioned, and valve closed, there is then presented the greatest or maximum stoppage to the passage of the heat and smoke. As a whole, this damper is so constructed as to be adjustable to the different degrees of draught of the same stove during different stages of the weather, also adjustable to the draughts of different stoves; and yet each varying of the damper is positive and different, and that, too, without any cog or intricate gearing, which may become useless by filling with soot or condensed vapor.

What I claim as my invention, and desire to secure by Letters Patent, is—

I claim the damper herein described, consisting of plate A, intermediate between the flange plates B B, provided with the revolving valve E, the whole arranged and operating in connection with handle F and rod C, substantially as set forth.

WILLIAM V. PERRY.

Witnesses:
CHAS. W. RUSSELL,
LORENZO D. LIVERMORE.